(12) United States Patent
Shen et al.

(10) Patent No.: US 11,019,813 B2
(45) Date of Patent: Jun. 1, 2021

(54) TERMITE DETECTION DEVICE, DETECTION SYSTEM AND DETECTION METHOD

(71) Applicant: ZHEJIANG DEKAN ENVIRONMENT TECHNOLOGY CO., LTD., Zhejiang (CN)

(72) Inventors: Junfeng Shen, Zhejiang (CN); Weiqiang Shen, Zhejiang (CN); Hanmin Ji, Zhejiang (CN); Meifen Fei, Zhejiang (CN)

(73) Assignee: ZHEJIANG DEKAN ENVIRONMENT TECHNOLOGY CO., LTD., Zhejiang (CN)

( * ) Notice: Subject to any disclaimer, the term of this patent is extended or adjusted under 35 U.S.C. 154(b) by 425 days.

(21) Appl. No.: 15/742,728

(22) PCT Filed: Jul. 7, 2016

(86) PCT No.: PCT/CN2016/089226
§ 371 (c)(1),
(2) Date: Jan. 8, 2018

(87) PCT Pub. No.: WO2017/005209
PCT Pub. Date: Jan. 12, 2017

(65) Prior Publication Data
US 2018/0199561 A1    Jul. 19, 2018

(30) Foreign Application Priority Data

Jul. 8, 2015 (CN) .......................... 201510395381.2
Jul. 8, 2015 (CN) .......................... 201510395730.0

(51) Int. Cl.
*A01M 1/02* (2006.01)
*G08B 21/18* (2006.01)
*H04B 7/24* (2006.01)

(52) U.S. Cl.
CPC ............. *A01M 1/026* (2013.01); *G08B 21/18* (2013.01); *H04B 7/24* (2013.01)

(58) Field of Classification Search
CPC ........... A01M 1/026; A01M 1/02; A01M 1/00
(Continued)

(56) References Cited

U.S. PATENT DOCUMENTS 5,571,967 A * 11/1996 Tanaka ...................... G01N 3/42
340/573.2
6,370,811 B1    4/2002 Masterson
(Continued)

FOREIGN PATENT DOCUMENTS

CN    1111088 A  * 11/1995 ............... G01N 3/42
CN    1111088 A    11/1995
(Continued)

OTHER PUBLICATIONS

Shude, Pan, Espacenet CN 201754724 U machine translation of the Description, Date of patent: Mar. 9, 2011, translation obtained 2019 (Year: 2011).*

(Continued)

*Primary Examiner* — Darren W Ark
*Assistant Examiner* — Katelyn T Truong
(74) *Attorney, Agent, or Firm* — Muncy, Geissler, Olds & Lowe, P.C.

(57) ABSTRACT

A termite detection device, system, and method. The device includes a housing and bait strip. A first circuit board and detection switch are on the bait strip. A deep hole with a non-through bottom is in the bait strip. A supporting body capable of ascending/descending is in the deep hole for supporting a detected body. The first circuit board is electrically connected to the switch, to determine on/off of the switch. The system includes the termite detection device, a detector, and a database. The device sends a signal of the (Continued)

switch to the database via the detector. In the method, the detector triggers the termite detection device or the termite detection device is automatically triggered. The first circuit board determines on/off of the switch, and sends to the database via the detector for processing/storage. The switch is in a power-off state when no detection is performed.

8 Claims, 5 Drawing Sheets

(58) Field of Classification Search
USPC .............. 43/132.1, 124, 131; 340/573.2
See application file for complete search history.

(56) References Cited

U.S. PATENT DOCUMENTS

| | | | | |
|---|---|---|---|---|
| 2002/0185605 | A1* | 12/2002 | Shuman | A01M 1/026 250/341.7 |
| 2004/0140900 | A1* | 7/2004 | Barber | A01M 1/026 340/573.2 |
| 2007/0256350 | A1* | 11/2007 | Cates | A01M 1/026 43/132.1 |
| 2009/0188155 | A1* | 7/2009 | Tolley | A01M 1/02 43/131 |

FOREIGN PATENT DOCUMENTS

| | | | |
|---|---|---|---|
| CN | 201000468 Y | | 1/2008 |
| CN | 201754724 U | * | 3/2011 |
| CN | 201754724 U | | 3/2011 |
| CN | 104982399 A | | 10/2015 |
| JP | 09172934 A | * | 7/1997 |
| JP | 3808497 B1 | | 8/2006 |

OTHER PUBLICATIONS

Okamoto Akira, Espacenet CN 1111088 A machine translation of the Description, Date of publication Nov. 8, 1995, translation obtained 2019 (Year: 1995).*

* cited by examiner

TERMITE DETECTION DEVICE, DETECTION SYSTEM AND DETECTION METHOD

TECHNICAL FIELD

The present invention relates to the field of termite prevention and treatment, and in particular, relates to a termite detection device, a termite detection system, and a termite detection method.

BACKGROUND

Termites are one of the five largest pests in the world, especially in tropical and subtropical regions. Termites eat all the plants, and the formic acid secreted in vivo thereof also corrodes steel bars and makes concrete degenerate. Termites cause a lot of damages to people's daily life, including damages to buildings, dams, crops, books, underground cables, and the like, and the damages are invisible. For example, damages caused by termites to buildings, especially to buildings of brick-wood structures and wooden structures are usually hidden inside the structures; surfaces of damaged objects are in a perfect shape, but thousands of holes are actually formed inside, usually causing collapse of buildings, resulting in property loss and casualties.

For a long time, the prevention and treatment method of termites is drug prevention. Insecticides are applied to the soil. The used insecticides will cause environmental pollution and pose a threat to human health. Therefore, people put forward non-drug prevention, and design a termite prevention and treatment device. A bait strip that termites like to eat is placed in a housing provided with a hole, and after a period of time, the device is taken out to see whether the bait strip has been eroded, to determine whether there is a termite. Because devices of this type need to be disposed every several meters from buildings, and therefore the amount of work is huge.

With respect to the above shortcomings, some people provide an improved device for termite prevention and treatment. The device is checked in a non-opened manner, that is, whether there is a termite herein can be determined without opening the device. A power-on metal line is disposed between upper and lower ends of a bait strip in the housing, and when the metal line is bitten broken, it is determined that there is a termite. However, there are also some shortcomings of this method: (1) the metal line is easily oxidized, and after a long time, even if there are no termites, the metal line will be broken due to oxidation and other reasons, so that there is a certain false alarm rate, and the national detection requirements cannot be met; (2) the device has a short life of service, and a complex process; and (3) because the device is powered on, the device has high requirements for the environment, and cannot be used in environments such as an environment having water, a wet environment, and acid soil, and the adaptability is poor.

SUMMARY OF THE INVENTION

The invention put forwards a termite detection device, a termite detection system, and a termite detection method with respect to the problems in the above prior art. Non-drug prevention and treatment are provided, and do not cause pollution to the environment. Whether there is a termite is detected by triggering an inductive switch by descending of a supporting body; the device is in a power-off state when no detection is performed, and can be adapted to severe soil environments such as a wet soil environment or an acid soil environment, and the device has a wide application range, and a low false alarm rate, resolving the problems that the existing termite prevention and treatment device has high requirements for the environment and has a high false alarm rate.

To resolve the foregoing technical problems, the present invention is implemented by using the following technical solutions:

The present invention provides a termite detection device, comprising: a housing with a hole allowing entry of a termite and a bait strip disposed in the housing, wherein a first circuit board and a detection switch are disposed on the bait strip;

a deep hole with a non-through bottom is formed in the bait strip, a supporting body capable of ascending and descending is filled in the deep hole, the supporting body is used to support a detected body, when the detected body is located in a detection range of the detection switch, the detection switch is in an on state, and when the detected body is located beyond the detection range of the detection switch, the detection switch is in an off state;

the first circuit board is electrically connected to the detection switch, to determine on/off of the detection switch;

in a normal case, when the deep hole is not bitten through by a termite, the supporting body supports the detected body to make it located in the detection range of the detection switch, and when the deep hole is bitten through by the termite, the supporting body descends, so that the detected body is located beyond the detection range of the detection switch.

Preferably, the detection switch is an inductive switch or an elastic switch; the inductive switch may be a magnetic inductive switch, a capacitive inductive switch, or an inductance type inductive switch.

Preferably, the supporting body is solid particles, high pressure gases, or liquids that fill up the entire deep hole, and is not vulnerable to severe environments, and can also be used in wet and acid soil.

Preferably, a plurality of solid particles are disposed side by side and disposed in a staggered manner. In this way, non-metal particles more easily flow out of a side surface hole bitten through by termites, and whether there is a termite is determined in a more in-time manner.

Preferably, the solid particles are non-metal particles, such as glass beads, which are corrosion resistant, do not easily deform, and have a long life of service. Further, the volume of the non-metal particles may be set to be smaller than that of a termite, so that a termite can be detected more quickly. As long as a small hole is bitten on a side surface of the deep hole, non-metal particles roll out, that is, a termite can be detected when a small part of the bait strip is eaten.

Preferably, the supporting body is a plurality of magnet steels, and the plurality of magnet steels at least include: a top magnet steel and a bottom magnet steel, the top magnet steel is located above the bottom magnet steel, and the bottom magnet steel is fixed on the bottom of the deep hole; in a normal case, the deep hole restrains overturn of the top magnet steel; the bottom magnetic pole of the top magnet steel is the same as the top magnetic pole of the bottom magnet steel, the top magnet steel and the bottom magnet steel repel each other, and the top magnet steel supports the detected body, so that the detected body is located in the detection range of the detection switch; when the deep hole is bitten through by a termite, the top magnet steel turns over, so that the bottom magnetic pole of the top magnet steel is opposite to the top magnetic pole of the bottom magnet steel, and the top magnet steel and the bottom magnet steel attract each other, so that the top magnet steel is attracted by the bottom magnet steel to the bottom of the deep hole, making the detected body descend and exceed the detection range of the detection switch.

Preferably, the plurality of magnet steels further include: a middle magnet steel, and the middle magnetic steel is located between the top magnet steel and the bottom magnet steel; The amount of the middle magnet steels is an odd number or an even number, and the plurality of middle magnet steels are arranged up and down;

the top magnetic pole of the middle magnet steel is the same as the bottom magnetic pole of the top magnet steel, and the bottom magnetic pole of the middle magnet steel is the same as the top magnetic pole of the bottom magnet steel;

when the amount of middle magnet steels is an even number, the bottom magnetic pole of the top magnet steel is the same as the top magnetic pole of the bottom magnet steel; and when the amount of middle magnet steels is an odd number, the bottom magnetic pole of the top magnet steel is opposite to the top magnetic pole of the bottom magnet steel;

when a plurality of middle magnet steels are included, magnetic poles of adjacent surfaces of adjacent two of the middle magnet steels are the same.

Preferably, each middle magnet steel comprises a plurality of magnet steel units, and the plurality of magnet steel units are arranged up and down;

magnetic properties of surfaces, contacting each other, of adjacent two of the magnet steel units are opposite.

The present invention further provides a termite detection system, comprising:

at least a termite detection device, a detector, and a database, wherein the termite detection device is the termite detection device according to any one of claims 1 to 7, and the first circuit board is used to transmit a first data signal according to on/off of the detection switch;

the detector comprises a mobile communication unit and a second circuit board, the second circuit board is respectively connected to the mobile communication unit and the first circuit board, the second circuit board is used to receive the first data signal and process the first data signal, send the processed signal to the mobile communication unit, and transmit a second data signal via the mobile communication unit;

the database is wirelessly connected to the mobile communication unit, to receive the second data signal, and process and store the second data signal.

Preferably, the termite detection device employs wireless power supply or power supply by using a built-in battery;

when the termite detection device employs wireless power supply, the detector further comprises: a power supply unit, wherein the power supply unit is wirelessly connected to the termite detection device, and when detection is needed, the power supply unit supplies power to the termite detection device in a wireless manner.

Preferably, a first ID number is preset for the first circuit board, and/or a second ID number is preset for the second circuit board.

Preferably, the termite detection system further comprises a geographical location positioning unit, which is disposed on the first circuit board and/or the second circuit board.

Preferably, the termite detection system further comprises an alarm unit, which is disposed on the first circuit board and/or the second circuit board.

Preferably, the termite detection system further comprises a voice prompt unit, which is disposed on the first circuit board and/or the second circuit board.

The present invention further provides a termite detection method, comprising the following steps:

S11: a detector triggers a termite detection device or the termite detection device is automatically triggered, and a first circuit board of the termite detection device determines on/off of a detection switch, and transmits a first data signal;

S12: a second circuit board of the detector receives and processes the first data signal, sends the processed signal to a mobile communication unit, and transmits a second data signal via the mobile communication unit;

S13: a database receives the second data signal, and processes and stores the second data signal, wherein a method for determining on/off of the detection switch by the first circuit board in step S11 is specifically that:

when a deep hole with a non-through bottom in a bait strip of the termite detection device is bitten broken by a termite, a supporting body descends, and a detected body supported by the supporting body leaves a detection range of the detection switch, and the detection switch is switched off; and when the deep hole with a non-through bottom in the bait strip of the termite detection device is not bitten broken by a termite, the supporting body does not descend, and the detected body supported by the supporting body is still in the detection range of the detection switch, and the detection switch is switched on.

Preferably, step S13 further comprises: the database receives an ID number corresponding to the first circuit board and/or the second circuit board, and stores same.

Preferably, the first data signal and/or the second data signal further comprise detection time and/or location information.

Preferably, step S12 further comprises: when detecting a termite, the termite detection device and/or the detector sends an alarm signal and/or makes a voice prompt.

The present invention further provides a termite detection device, comprising a bait strip, and a detection unit is disposed on the bait strip;

the detection unit is used to detect whether the bait strip is eaten, and further to detect whether there is a termite; if the bait strip is eaten, it indicates that there is a termite, and if the bait strip is not eaten, it indicates that there is no termite; when detection needs to be performed, power is supplied to the detection unit, to trigger the detection unit for detection.

Compared with the prior art, the present invention has the following advantages:

(1) the termite detection device, the termite detection system, and the termite detection method that are provided in the present invention are in a power-off state when no detection is performed; on/off of the detection switch is not based on whether electricity is applied; the detection switch, the detected body, and the supporting body are three relative independent bodies, and are not based on conductivity, have no environmental requirements, and can be used in wet, acid, and other environments;

(2) the termite detection device, the termite detection system, and the termite detection method of the present invention have simple processes, and the supporting body used for supporting the inductive switch does not have the problem of being oxidized, and therefore has a long service life and a low false alarm rate, and can meet the national detection requirements; and (3) the termite detection device, the termite detection system, and the termite detection method of the present invention perform non-drug prevention, and do not cause pollution to the environment. Certainly, all of the foregoing advantages are not necessarily simultaneously achieved by implementing any product of the present invention.

BRIEF DESCRIPTION OF THE DRAWINGS

Implementations of the present invention are further described below with reference to the accompanying drawings.

Descriptions of reference signs: 1—termite detection device, 2—detector, 3—database;
11—housing, 12—top cover, 13—bait strip;
111—hole;
121—first circuit board, 122—detection switch;
131—deep hole, 132—glass bead, 133—detected body, 134—top magnet steel, 135—bottom magnet steel,
136—middle magnet steel;
1361—magnet steel unit;
21—power supply unit, 22—second circuit board, 23—mobile communication unit.

DETAILED DESCRIPTION OF THE INVENTION

Embodiments of the present invention are described in detail below, and are implemented by using technical solutions of the present invention as preconditions. Detailed implementations and specific operating processes are provided. However, the protection scope of the present invention is not limited to the following embodiments.

Embodiment 1

Figure 1:
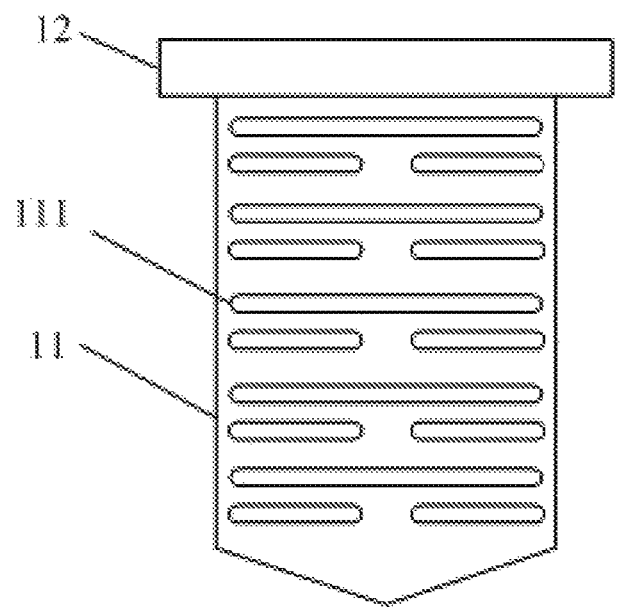
FIG. 1 is a schematic structural diagram of a termite detection device according to Embodiment 1 of the present invention.
Figure 2:
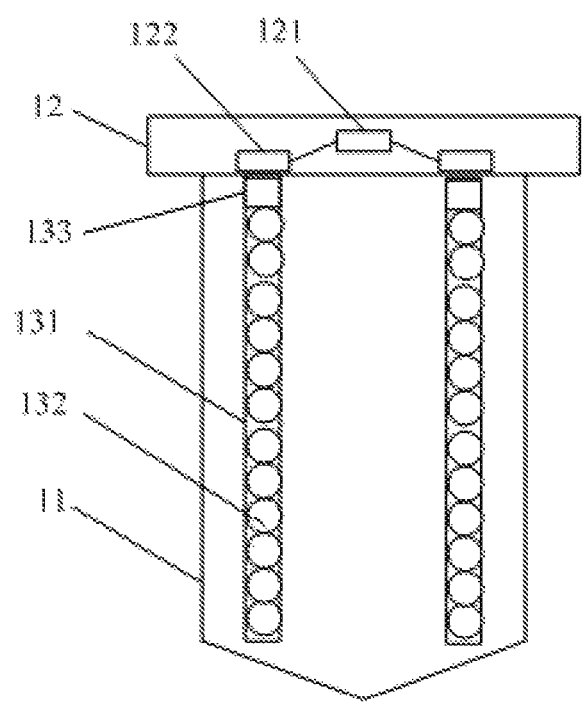
FIG. 2 is a sectional view of the termite detection device according to Embodiment 1 of the present invention.

With reference to FIG. 1 and FIG. 2, this embodiment describes the termite detection device of the present invention in detail, and the schematic structural diagram thereof is shown in FIG. 1, and the sectional view thereof is shown in FIG. 2. The termite detection device includes: a housing 11, a top cover 12, and a bait strip 13; the top cover 12 is covered on the housing 11; the bait strip 13 is located in the housing 11; a hole 111 is disposed on the housing 11. a deep hole 131 with a non-through bottom is formed in the bait strip 13; the deep hole 131 is filled up with a supporting body for supporting a detected body 133 of a detection switch 122, so that the detection body 133 is located in a detection range of the detection switch 122; when the supporting body descends, the detected body 133 descends with the supporting body, so that the detected body 133 leaves a detection range of the detection switch 122; the detection switch 122 and a first circuit board 121 connected thereto are disposed in the top cover 12; when the top cover 12 is covered above the housing 11, the detection switch 122 is located above the detected body 133.

Figure 3:
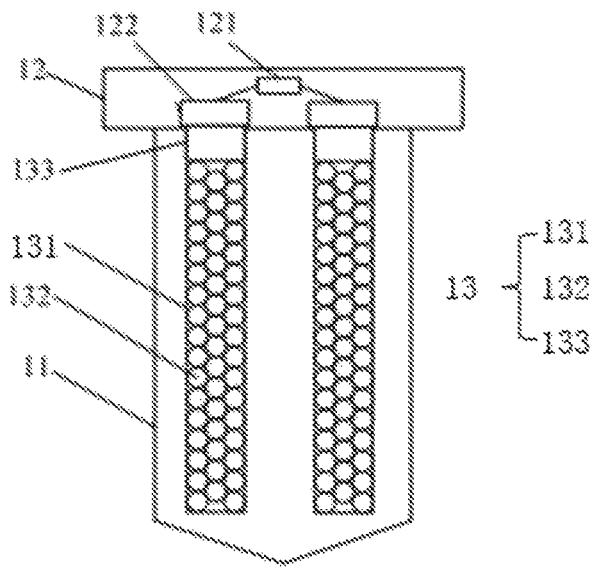
FIG. 3 is a sectional view of a termite detection device according to a preferred embodiment of the present invention.

The housing 11 is embedded underground. When there is a termite in the area, the termite eats the bait strip 13, and the deep hole 131 built in the bait strip 13 is bitten broken to be in communication with the outside, and a supporting body 132 in the deep hole 131 flows out or rolls out; when the above supporting body 132 descends, the detected body 133 also descends and leaves a detection range of the detection switch 122; the state of the detection switch 122 changes; the first circuit board 121 senses the change and sends a signal, and it can be determined that a termite appears here. In this embodiment, the supporting body is a glass bead 132, and a sectional view thereof is shown in FIG. 2. In a preferred embodiment, a plurality of glass beads 132 are disposed side by side, and is disposed in a staggered manner, and a sectional view thereof is shown in FIG. 3; such a configuration enables the glass beads 132 to more easily flow out of a hole that is on a side surface and is bitten through by the termite, so that the termite is found in a more in-time manner.

In different embodiments, the supporting body may also be high pressure gases or liquids. In this way, as long as a small notch appears in the deep hole, the high pressure gases or liquids flow out of the notch, so that whether there is a termite is determined in a more in-time manner. When the supporting body is high pressure gases, the pressure of the gases makes the detected body 133 located on the top end of the deep hole 131, so that the detected body 133 is located in a detection range of the detection switch 122; when the supporting body is liquids, the buoyant force of the liquids makes the detected boy 133 suspend on the top end of the deep hole 131, and locate in the detection range of the detection switch 122, or an object that can more easily suspend, such as wood, is placed on a lower end of the detected body 133, so that the detected body 133 suspends more easily.

In different embodiments, the detection switch 122 may also be an elastic switch; when the detected body 133 supports the detection switch 122, the detection switch 122 is pressed to be in an on state; when the detected body 133 descends with the supporting body, the detected body 133 leaves the detection switch 122, and the detection switch 122 pops up to be in an off state; The detection switch 122 may also be an inductive switch, and preferably, is a magnetic inductive switch; correspondingly, the detected body 133 is magnetic steel. When the detection switch 122 is an inductive switch, the detection switch 122 is connected to the detected body 133 is a non-contact manner, and in a non-conductive manner, and can be used even in an environment with water, a wet environment, an acid environment, or other environments, and there is no false alarm. The existing termite detection device determines whether there is a termite by using a conducted metal line, and cannot be used in an environment with water, a wet environment, or an acid environment, because in the environment with water, the wet environment, or the acid environment, even if the metal line is bitten broken by a termite, the device is still in an on state, and has a high false alarm rate.

In this embodiment, the housing 11 is disposed separate from the top cover 12. In different embodiments, the top cover 12 and the housing 11 may also be set into an integral structure.

Embodiment 2

Figure 4:
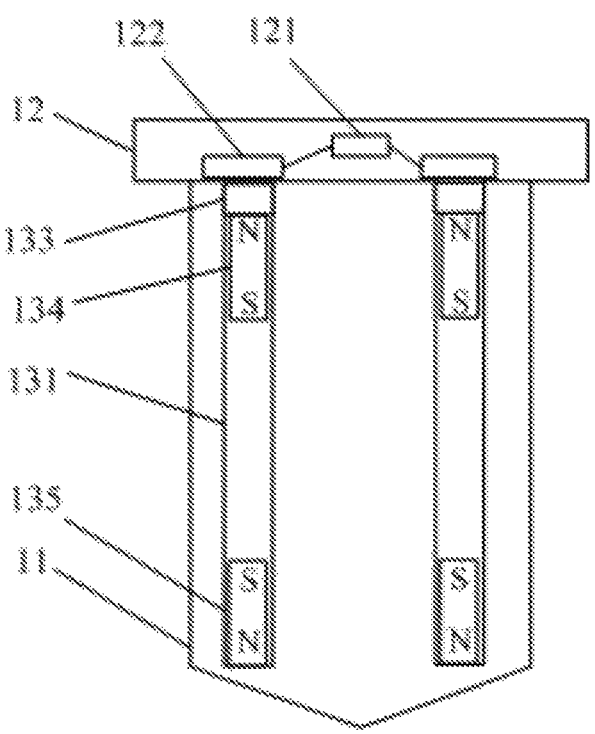
FIG. 4 is a sectional view of the termite detection device according to Embodiment 2 of the present invention.

This embodiment is another embodiment of the termite detection device of the present invention. The schematic structural diagram of the termite detection device is also shown in FIG. 1, and the sectional view is shown in FIG. 4. This embodiment differs from Embodiment 1 in that the setting manners of the supporting body are different. In this embodiment, the supporting body includes a plurality of magnet steels. In this embodiment, the supporting body includes a top magnet steel 134 and a bottom magnet steel 135; the bottom magnet steel 135 is fixed on the bottom of the deep hole 131; the top magnet steel 134 is located above the bottom magnet steel 135; the bottom magnetic pole of the top magnet steel 134 is the same as the top magnet pole of the bottom magnet steel 135; as shown in FIG. 2, in this embodiment, the bottom magnetic pole of the top magnet steel 134 is an S pole, and the top magnetic pole of the bottom magnet steel 135 is also an S pole, and in different embodiments, the bottom magnetic pole of the top magnet steel 134 and the top magnetic pole of the bottom magnet steel 135 may also be both N poles. When the magnet steel is a cylindrical magnet steel, the inner diameter of the deep hole 131 is slightly greater than that of the magnet steel; when the side surface of the deep hole 131 is not through, the pore size of the deep hole 131 restrains overturn of the magnet steel; because the magnet poles are the same, they repel each other, so that the top magnet steel 134 suspends on the top end of the deep hole 131, and supports the detected body 133, so that the detected body 133 is located in the detection range of the detection switch 122, and the detection switch is in an on state; the housing 11 is embedded underground; when there is a termite in the area, the termite eats the bait strip 13, and the deep hole 131 built in the bait strip 13 is bitten through; the top magnet steel 134 is not constrained by the pore size of the deep hole 131; under the effect of the magnetic field, the top magnet steel 134 turns over, and the bottom magnetic pole of the top magnet steel 134 becomes opposite to the magnet pole of the bottom magnet steel 135; they attract each other; the top magnet steel 134 is attracted by the bottom magnet steel 135, and is attracted to the bottom of the deep hole 131; because the top magnet steel 134 descends, the detected body 133 supported thereby also descends, and is located beyond the detection range of the detection switch 122; the detection switch 122 is in an off state; therefore, whether there is a termite can be determined by determining on/off of the detection switch.

In a preferred embodiment, the magnetic property of the bottom magnet steel 135 is greater than the magnetic property of the top magnet steel 134; when the side surface of the deep hole 131 is conducted, the top magnet steel 134 can be attracted to the bottom of the deep hole 131 more quickly, and the existence of the termite can be determined in real time.

Figure 5:
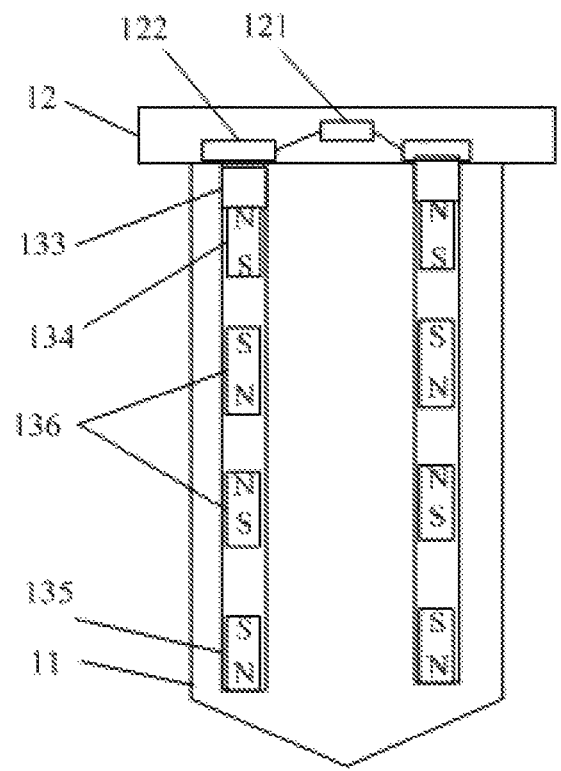
FIG. 5 is a sectional view of a termite detection device according to another preferred embodiment of the present invention.
Figure 6:
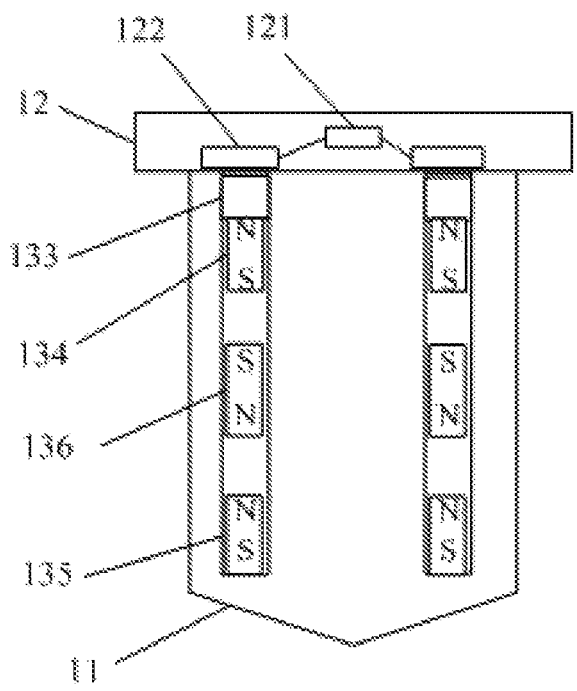
FIG. 6 is a sectional view of a termite detection device according to another preferred embodiment of the present invention.

In a preferred embodiment, to enable the top magnet steel 134 to be attracted more easily, a middle magnet steel 136 is further disposed; the middle magnet steel 136 is located between the top magnet steel 134 and the bottom magnet steel 135; the amount of the middle magnet steels 136 is an odd number or an even number. When the amount of the middle magnet steels 136 is an even number, for example, 2, the even middle magnet steels 136 are arranged up and down; as shown in FIG. 5, the bottom magnetic pole of the top magnet steel 134 is still the same as the top magnetic pole of the bottom magnet steel 135, and are both S poles; and the top magnet pole of the middle magnet steel 136, that is, the top magnetic pole of the middle magnet steel 136 on the uppermost end is the same as the bottom magnetic pole of the top magnet steel 134, and are both S poles; the bottom magnetic pole of the middle magnet steel 136, that is, the bottom magnetic pole of the middle magnet steel 136 on the lowest end is the same as the top magnetic pole of the bottom magnet steel 135, and are both S poles. When the amount of the middle magnet steels 136 is an odd number, for example, one, as shown in FIG. 6, in this case, the bottom magnetic pole of the top magnet steel 134 is not the same as the top magnetic pole of the bottom magnet steel 135, and the bottom magnetic pole of the top magnet steel 134 is an S pole; the top magnetic pole of the bottom magnet steel 135 is an N pole; the top magnetic pole of the middle magnet steel 136 is the same as the bottom magnetic pole of the top magnet steel 134, and is an S pole; the bottom magnetic pole of the middle magnet steel 136 is the same as the top magnetic pole of the bottom magnet steel 135, and is an N pole.

Regarding the foregoing two cases, normally, the middle magnet steel 136 and the bottom magnet steel 135 repel each other, and the middle magnet steel 136 and the top magnet steel 134 also repel each other; by means of such setting, the effect of the magnetic effect is larger, and the supporting force for the top magnet steel 134 is larger; when the deep hole is bitten through by a termite, the middle magnet steel 136 and the top magnet steel 134 both turn over, the middle magnet steel 136 is attracted by the bottom magnet steel 135, and the top magnet steel 134 is attracted by the middle magnet steel 312, and the attracting force is larger, so that detection can be completed more quickly. In different embodiments, there may also be three, four, or more middle magnet steels, and the setting principle is the same; adjacent two middle magnet steels 136 repel each other; the top magnetic pole of the middle magnet steel 136 is the same as the bottom magnetic pole of the top magnet steel 134; the bottom magnetic pole of the middle magnet steel 136 is the same as the top magnetic pole of the bottom magnet steel 135, and details are not described herein again.

Figure 7:
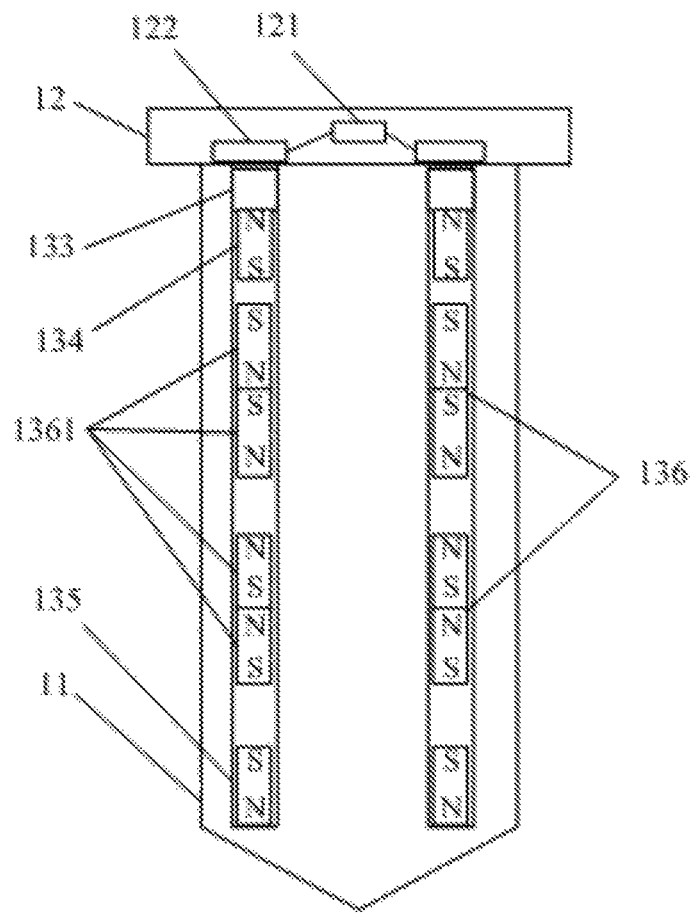
FIG. 7 is a sectional view of a termite detection device according to another preferred embodiment of the present invention.

In a preferred embodiment, each middle magnet steel 136 may include a plurality of magnet steel units. As shown in FIG. 7, by using that each middle magnet steel 136 includes two magnet steel units 1361 as an example, magnet poles of surfaces, contacting each other, of adjacent two magnet steel units 1361 of a same middle magnet steel are opposite, that is, magnet steel units 1361 of a same middle magnet steel attract each other. In this embodiment, by using that each middle magnet steel 136 includes two magnet steel units 1361 as an example, in different embodiments, each middle magnet steel 136 may also include more than two magnet steel units 1361; the setting principle is the same, and details are not described herein again.

In different embodiments, the top magnet steel and the bottom magnet steel may also include a plurality of magnet steel units, and the setting manner can be obtained according to a magnetism principle, and details are not described herein again.

In different embodiments, the detection switch 122 may also be an elastic switch; when the detected body 312 supports the detection switch 122, the detection switch 122 is pressed to be in an on state; when the detected body 312 descends with the supporting body 311, the detected body 312 leaves the detection switch 122, and the detection switch 122 pops up to be in an off state; The detection switch 122 may also be an inductive switch, and preferably, is a magnetic inductive switch; correspondingly, the detected body 312 is magnetic steel. When the detection switch 122 is an inductive switch, the detection switch 122 is connected to the detected body 312 in a non-contact manner, and in a non-conductive manner, and can be used even in an environment with water, a wet environment, an acid environment, or other environments, and there is no false alarm. The existing termite detection device determines whether there is a termite by using a conducted metal line, and cannot be used in an environment with water, a wet environment, and an acid environment, because in the environment with water, the wet environment, and the acid environment, even if the metal line is bitten broken by a termite, the device is still in an on state, and has a high false alarm rate. In this embodiment, the top cover 12 is disposed separate from the housing 11. In different embodiments, the top cover 12 and the housing 11 may also be set into an integral structure.

Embodiment 3

Figure 8:
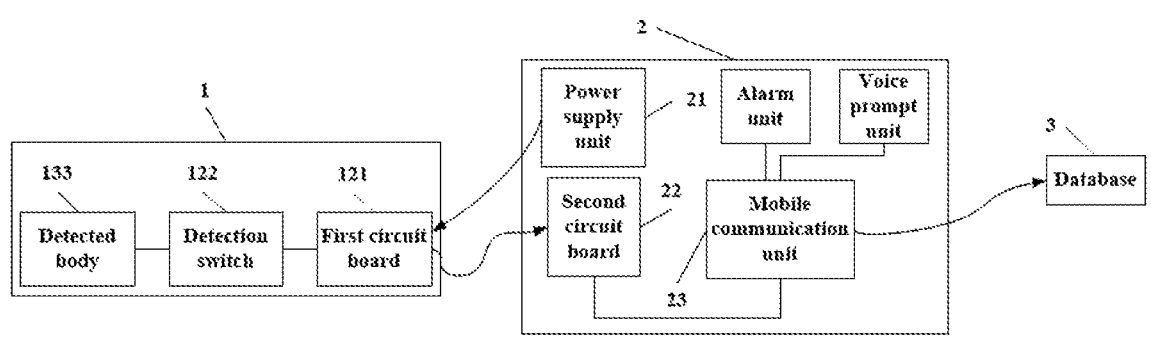
FIG. 8 is a schematic diagram of a termite detection system according to an embodiment of the present invention.

With reference to FIG. 8, this embodiment describes a termite detection system of the present invention in detail, and the termite detection system of this embodiment includes: a termite detection device 1, a detector 2, and a database 3; the termite detection device 1 is the termite detection device described in Embodiment 1 and is embedded underground; the first circuit board 121 transmits a first data signal according to a state of the detection switch 122; the detector 2 is used to trigger the termite detection device, and includes a power supply unit 21, a second circuit board 22, and a mobile communication unit 23; the second circuit board 22 is connected to the mobile communication unit 23, and is used to transmit a data signal of the second circuit board 22 to the database 3; the power supply unit 21 and the second circuit board 22 are respectively wirelessly connected to the first circuit board 121; when the termite detection device 1 needs to be detected, the termite detection device 1 is triggered by using the detector 2; the power supply unit 21 wirelessly supplies power to the first circuit board 121; the second circuit board 22 is used to receive and process the first data signal sent by the first circuit board 121, and transmit a second data signal; the database 3 is wirelessly connected to the mobile communication unit 23 of the detector 2, to receive the second data signal sent by the second circuit board 22, and process and store the second data signal.

the detector 2 may be handheld, and when the detector 2 is close to the termite detection device, the termite detection device is triggered; the detector 2 may also be fixed at a fixed position; one detector may correspond to a plurality of termite detection devices, and may trigger the termite detection devices regularly by means of program setting; staff do not need to go to the site, and detection of the plurality of termite detection devices can be simultaneously completed, so that the work load is reduced, and the working efficiency is improved.

In a preferred embodiment, the termite detection system further includes an alarm unit and/or a voice prompt unit and/or a geographical location positioning unit. The alarm unit may be disposed on the first circuit board 121 or the second circuit board 22; the voice prompt unit may also be disposed on the first circuit board 121 or the second circuit board 22; when a termite is detected, that is, when the state of the detection switch 122 changes into an off state, the alarm device sends an alarm signal, and the voice prompt unit sends a voice prompt. The geographical location positioning unit may be disposed on the first circuit board 121 or the second circuit board 22; when the termite detection device 1 is detected, location information thereof may also be simultaneously sent to the database, so as to check the location information thereof.

In this embodiment, power is supplied to the termite detection device 1 by using the power supply unit 21 of the detector 2. In different embodiments, the termite detection device 1 may also supply power to itself by using a built-in battery. In this case, when the detector 2 is fixed at a fixed position, a timing unit may also be disposed in the termite detection device 1. In this way, the termite detection device 1 may be automatically and regularly triggered to send the first data signal to the detector 2.

Embodiment 4

Figure 9:
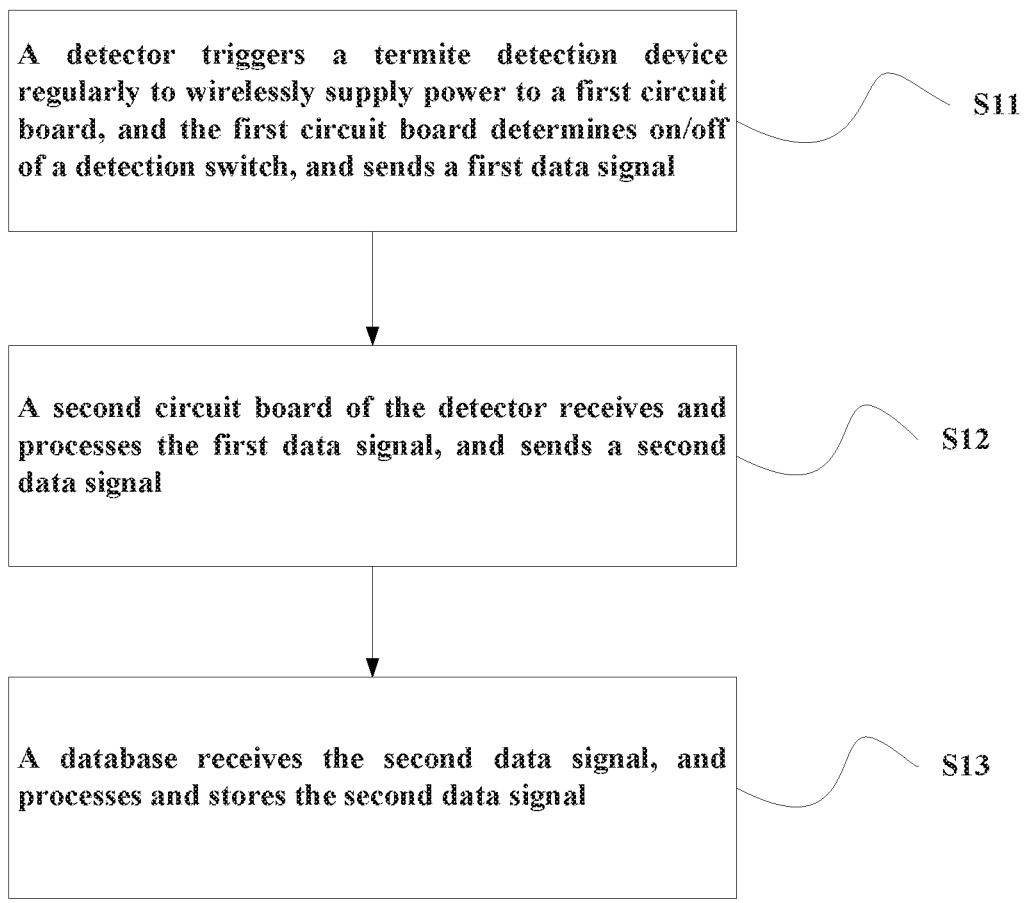
FIG. 9 is a flowchart of a termite detection method according to an embodiment of the present invention.

With reference to FIG. 9, this embodiment describes a termite detection method of the present invention in detail, and the termite detection method is a detection method corresponding to the termite detections system of Embodiment 2, and includes the following steps:

S11: when detection needs to be performed, a detector 2 triggers a termite detection device 1 or the termite detection device is automatically triggered, and a first circuit board 121 determines on/off of a detection switch, and transmits a first data signal;

S12: a second circuit board 22 of the detector 2 receives the first data signal, makes display according to an on/off signal, and transmits a second data signal to a database 3 by connecting a mobile communication unit 23 to the Internet;

S13: the database 3 receives the second data signal, and processes and stores the second data signal. determining on/off of the detection switch by the first circuit board in step S11 is specifically that: When there is a termite, and a deep hole with a non-through bottom in a bait strip of the termite detection device is bitten broken by the termite, a supporting body descends, and a detected body supported by the supporting body leaves a detection range of the detection switch, and the detection switch is switched off;

When there is no termite, and the deep hole with a non-through bottom in the bait strip of the termite detection device is not bitten broken by the termite, a supporting body does not descend, and the detected body supported by the supporting body is still in the detection range of the detection switch, and the detection switch is switched on.

In different embodiments, the method for triggering the termite detection device by the detector may be triggering the device when the detector is close to the device, or may be triggering the device regularly.

In a preferred embodiment, step S12 further includes: the second circuit board 22 of the detector 2 further sends a detection time signal; correspondingly, step S13 further includes: the database 3 receives the detection time signal, and stores the detection time signal.

In a preferred embodiment, step S13 further includes: the database 3 receives an 1D number corresponding to the first circuit board 121 and the second circuit board 22, and stores same.

In a preferred embodiment, step S12 further includes: when a termite is detected, that is, when the state of the detection switch 122 changes, the detector 2 further transmits an alarm signal and makes a voice prompt.

In a preferred embodiment, the first data signal or the second data signal further includes location information.

Only preferred embodiments of the present invention are disclosed herein. These embodiments are selected and specifically described in this specification to better explain the principle and actual application of the present invention, rather than limit the present invention. Any modification or change made by a person of ordinary skill in the art within the scope of the specification falls within the protection scope of the present invention.

The invention claimed is:

1. A termite detection device, comprising: a housing with a hole allowing entry of a termite and a bait strip disposed in the housing, wherein a first circuit board and a detection switch are disposed on the bait strip;
   a deep hole with a non-through bottom is formed in the bait strip, and a supporting body capable of ascending and descending is filled in the deep hole, wherein the supporting body is used to support a detected body; when the detected body is located in a detection range of the detection switch, the detection switch is in an on state, and when the detected body is located beyond the detection range of the detection switch, the detection switch is in an off state;
   the first circuit board is electrically connected to the detection switch, to determine an on/off state of the detection switch; and
   in a normal case, when the deep hole is not bitten through by a termite, a top of the supporting body supports the detected body to make it located in the detection range of the detection switch, and when the deep hole is bitten through by the termite, the supporting body flows out or rolls out from the deep hole, causing the top of the supporting body to descend, so that the detected body is located beyond the detection range of the detection switch.

2. The termite detection device of claim 1, wherein the detection switch is an inductive switch or an elastic switch.

3. The termite detection device of claim 1, wherein the supporting body is solid particles, high pressure gases, or liquids that fill up the entire deep hole.

4. The termite detection device of claim 3, wherein the supporting body is a plurality of solid particles which are disposed side by side and disposed in a staggered manner.

5. A termite detection system, comprising at least a termite detection device, a detector, and a database, wherein:
   the termite detection device is the termite detection device according to claim 1, and the first circuit board is used to transmit a first data signal according to the on/off state of the detection switch;
   the detector comprises a mobile communication unit and a second circuit board, wherein the second circuit board is respectively connected to the mobile communication unit and the first circuit board, and the second circuit board is used to receive the first data signal and process the first data signal, and send the processed signal to the mobile communication unit, and transmit a second data signal via the mobile communication unit; and
   the database is wirelessly connected to the mobile communication unit, to receive the second data signal, and process and store the second data signal.

6. The termite detection system of claim 5, wherein the termite detection device employs wireless power supply or power supply by using a built-in battery;
   when the termite detection device employs wireless power supply, the detector further comprises: a power supply unit, wherein the power supply unit is wirelessly connected to the termite detection device, and when detection is needed, the power supply unit supplies power to the termite detection device in a wireless manner.

7. The termite detection system of claim 5, wherein a first identification number is preset for the first circuit board, and/or,
   a identification number is preset for the second circuit board.

8. The termite detection system of claim 5, further comprising a geographical location positioning unit, and/or an alarm unit, and/or a voice prompt unit;
   the geographical location positioning unit is disposed on the first circuit board and/or the second circuit board;
   the alarm unit is disposed on the first circuit board and/or the second circuit board; and
   the voice prompt unit is disposed on the first circuit board and/or the second circuit board.

* * * * *